United States Patent
Paul

(10) Patent No.: US 9,860,142 B2
(45) Date of Patent: Jan. 2, 2018

(54) APPARATUS, SYSTEM AND METHOD OF DATA COLLECTION AFTER SOFTWARE REMOVAL

(71) Applicant: Synchronoss Technologies, Inc., Bridgewater, NJ (US)

(72) Inventor: Sumeet Singh Paul, Evanston, IL (US)

(73) Assignee: Synchronoss Technologies, Inc., Bridgewater, NJ (US)

( * ) Notice: Subject to any disclaimer, the term of this patent is extended or adjusted under 35 U.S.C. 154(b) by 330 days.

(21) Appl. No.: 14/734,985

(22) Filed: Jun. 9, 2015

(65) Prior Publication Data

US 2015/0372886 A1 Dec. 24, 2015

Related U.S. Application Data

(60) Provisional application No. 62/016,004, filed on Jun. 23, 2014.

(51) Int. Cl.
*G06F 15/16* (2006.01)
*H04L 12/26* (2006.01)
(Continued)

(52) U.S. Cl.
CPC ........... *H04L 43/04* (2013.01); *G06F 8/62* (2013.01); *G06F 8/70* (2013.01); *H04L 41/069* (2013.01); *H04L 41/0813* (2013.01); *H04L 43/14* (2013.01); *H04L 67/1095* (2013.01); *H04W 4/001* (2013.01); *G06F 11/3051* (2013.01); *H04L 67/06* (2013.01); *H04L 67/22* (2013.01); *H04L 67/34* (2013.01); *H04L 69/40* (2013.01); *H04W 4/003* (2013.01)

(58) Field of Classification Search
USPC ......................... 709/217, 223, 224, 227, 245
See application file for complete search history.

(56) References Cited

U.S. PATENT DOCUMENTS 5,919,247 A 7/1999 Van Hoff et al.
7,634,651 B1 * 12/2009 Gerde ................. H04L 63/0428
713/153
(Continued)

FOREIGN PATENT DOCUMENTS

WO WO 2004/040923 A1 5/2004
WO WO 2014/018256 A1 1/2014

*Primary Examiner* — Liangche A Wang
(74) *Attorney, Agent, or Firm* — Synchronoss Technologies, Inc.; Frederick W. Dour

(57) ABSTRACT

Embodiments of the present invention are directed to generating and delivering data elements out of the context of an application installation. Each data element generated by an application is transmitted to a collection server after a networked computing device has connected back to a network, and even after the application has been removed from the networked computing device. Each data element is associated with a globally unique transaction identifier. Each data element and its corresponding transaction identifier are packaged together for transmission to the collection server via one or more of a plurality of transmission pathways, including a messaging pathway. The collection server uses the transaction identifier to check whether a corresponding data element is already stored by the collection server. The data element is stored by the collection server, if not already stored.

4 Claims, 3 Drawing Sheets

(51) Int. Cl.
*H04L 12/24* (2006.01)
*G06F 9/445* (2006.01)
*G06F 9/44* (2006.01)
*H04W 4/00* (2009.01)
H04L 29/08 (2006.01)
G06F 11/30 (2006.01)
H04L 29/14 (2006.01)

(56) References Cited

U.S. PATENT DOCUMENTS

| | | | |
|---|---|---|---|
| 8,131,281 B1 | 3/2012 | Hildner et al. | |
| 8,842,384 B2* | 9/2014 | Jhatakia | G11B 27/36 |
| | | | 360/31 |
| 9,405,599 B2* | 8/2016 | Pillers | |
| 2006/0294225 A1* | 12/2006 | Grecco | G06Q 30/02 |
| | | | 709/224 |
| 2010/0192210 A1* | 7/2010 | Purdy, Sr. | G06F 21/10 |
| | | | 726/7 |
| 2010/0274857 A1* | 10/2010 | Garza | G06F 11/08 |
| | | | 709/206 |
| 2012/0240236 A1* | 9/2012 | Wyatt | G06F 21/564 |
| | | | 726/25 |
| 2013/0054396 A1 | 2/2013 | Goldfinger et al. | |
| 2013/0061243 A1* | 3/2013 | Pillers | G06F 8/62 |
| | | | 719/313 |
| 2015/0142865 A1* | 5/2015 | Shimizu | H04L 67/10 |
| | | | 709/201 |

* cited by examiner

APPARATUS, SYSTEM AND METHOD OF DATA COLLECTION AFTER SOFTWARE REMOVAL

RELATED APPLICATIONS

This application claims benefit of priority under 35 U.S.C. section 119(e) of the co-pending U.S. Provisional Patent Application Ser. No. 62/016,004, filed Jun. 23, 2014, entitled "Data Collection Mechanism Supporting Transmission After Software Has Been Removed," which is hereby incorporated by reference in its entirety.

FIELD OF INVENTION

The present invention relates to data collection. More particularly, the present invention relates to an apparatus, system and method of data collection after software removal.

BACKGROUND OF THE INVENTION

Many device applications support the ability to collect data. In many cases, an end user is in a situation in which the device does not have Internet access to deliver the collected data to a centralized repository. When that occurs, there is an inherent assumption that the collected data is stored locally and is transmitted at such time when the device does establish Internet connectivity. There is a further assumption that the application, that is implementing the collection and transmission of the data, continues to be installed until such time as the Internet connection is restored. However, in the real world, there are numerous applications that are "one time use" by end users and after utilizing the functionality of those applications, the end users remove the applications from their devices prior to having an opportunity to transmit the collected data. This results in lost information which can never be regained or even identified as being lost. To prevent loss of the collected data, prior art solutions prevent the end users from uninstalling the applications or exiting the applications until there is Internet connectivity such that the collected data can be transmitted to the centralized repository. However, the prior art solutions are not user friendly and limit usability of the devices.

BRIEF SUMMARY OF THE INVENTION

Embodiments of the present invention are directed to generating and delivering data elements out of the context of an application installation. Each data element generated by an application is transmitted to a collection server after a networked computing device has connected back to a network, and even after the application has been removed from the networked computing device. Each data element is associated with a globally unique transaction identifier. Each data element and its corresponding transaction identifier are packaged together for transmission to the collection server via one or more of a plurality of transmission pathways, including a messaging pathway. The collection server uses the transaction identifier to check whether a corresponding data element is already stored by the collection server. The data element is stored by the collection server, if not already stored.

In one aspect, a wireless communication device is provided. The wireless communication device includes a processor and a first application executed by the processor. The first application is configured to generate application data, and the computing device is configured to transmit the application data to a collection server after the wireless communication device establishes a network connection, even after the first application has been removed from the wireless communication device.

In some embodiments, each element of the application data is stored with a unique transaction identifier in a data package.

In some embodiments, the wireless communication device also includes a second application executed by the processor. The second application includes a buffer configured to store data packages in a form of messages and to transmit the messages containing the data packages to the collection server after the wireless communication device establishes the network connection and the first application is uninstalled from the wireless communication device.

In some embodiments, the wireless communication device also includes an operating system. The operating system includes a buffer cache configured to store data packages along with a URL of the collection server. After the wireless communication device establishes the network connection and when the first application is uninstalled from the wireless communication device, the URL is retrieved and the stored data packages are transmitted to the collection server using the URL.

In another aspect, a method is provided. The method includes generating application data by an application on a computing device, combining each element of the application data with a unique transaction identifier to form a data package on the computing device, storing data packages in a buffer of the computing device, and transmitting the data packages in the buffer to a collection server upon the computing device establishing a network connection.

In some embodiments, the buffer is a messaging queue. In some embodiments, the method further includes, prior to storing data packages in a buffer, creating an image file for each of the data packages, wherein the image file includes a code, and embedding each image file in a message. The code is one of a three-dimensional code and a two-dimensional code. In some embodiments, the data packages are stored in the messaging queue as messages to be transmitted to the collection server, using a dedicated phone number associated with the collection server, via a messaging application on the computing device.

In some embodiments, the buffer is a buffer cache of an operating system of the computing device. In some embodiments, the method further includes, prior to transmitting the data packages in the buffer to a collection server, storing a URL of the collection server along with the data packages. In some embodiments, the data packages are transmitted to the collection server using the URL.

In some embodiments, the method also includes determining by the collection server whether each data package has been previously been stored by the collection server, based on a first determination, processing by the collection server the data package, and based on a second determination, discarding by the collection server the data package.

In some embodiments, determining by the collection server includes extracting a unique transaction identifier from the data package, wherein the first determination is a determination that the extracted identifier matches a record stored by the collection server, and wherein the second determination is a determination that the extracted identifier does not match any records stored by the collection server.

In some embodiments, processing by the collection server includes extracting a data element from the data package and storing the extracted data element along with the extracted identifier.

In some embodiments, the method also includes, prior to transmitting the data packages in the buffer, removing the application from the computing device.

In yet another aspect, a system is provided. The system includes a computing device and a collection server. The computing device stores an application configured to generate application data. The computing device is configured to transmit the application data after the computing device establishes a network connection, even after the application has been removed from the computing device. The collection server is configured to, for each application data element received at the collection server from the computing device, determine whether the application data element is already stored by the collection server, based on a determination that the application data element is not yet stored by the collection server, store the application data element and, based on a determination that the application data element is already stored by the collection sever, discard the application data element.

In some embodiments, the application data is transmitted in piecemeal to the collection server, and each application data element is associated with a unique transaction identifier.

In some embodiments, the application data is transmitted to the collection server via a plurality of transmission pathways.

In some embodiment, the application is provided by an application vendor, and the collection server is accessible by the application vendor.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

In the following description, numerous details are set forth for purposes of explanation. However, one of ordinary skill in the art will realize that the invention can be practiced without the use of these specific details. Thus, the present invention is not intended to be limited to the embodiments shown but is to be accorded the widest scope consistent with the principles and features described herein.

Embodiments of the present invention are directed to generating and delivering data elements out of the context of an application installation. Each data element generated by an application is transmitted to a collection server after a networked computing device has connected back to a network, and even after the application has been removed from the networked computing device. Each data element is associated with a globally unique transaction identifier. Each data element and its corresponding transaction identifier are packaged together for transmission to the collection server via one or more of a plurality of transmission pathways, including a messaging pathway. The collection server uses the transaction identifier to check whether a corresponding data element is already stored by the collection server. The data element is stored by the collection server, if not already stored.

Figure 1:
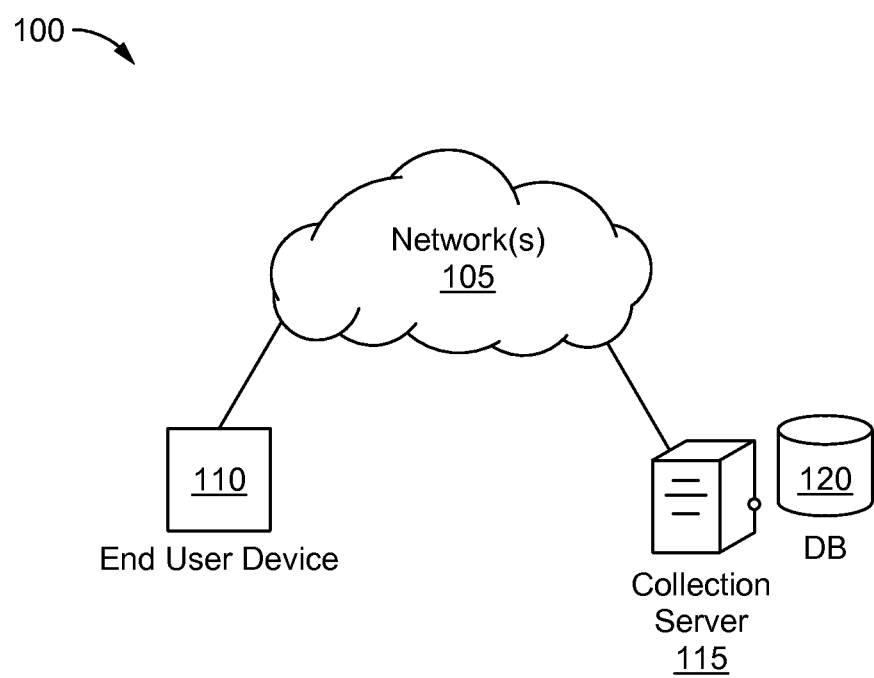
FIG. 1 illustrates an exemplary system in accordance with some embodiments.

FIG. 1 illustrates an exemplary system 100 in accordance with some embodiments. The system 100 includes, at least, a network 105, an end-user device 110, a collection server 115 and a repository 120. The end-user device 110 is able to communicate with the collection server 115 across the network 105. The collection server 115 stores in a repository 120 all content received from the end-user device 110 via one or more of a plurality transmission pathways. Although the repository 120 is shown separately from the collection server 115, the repository 120 is co-located with the collection 115.

The end-user device 100 typically includes, installed thereon, an application that is provided by an application vendor. The application can be a game application, a backup application, a transfer application, an address book application, a camera application, a memo application or another application. The collection server 115 is accessible by the application vendor. In some embodiments, the collection server 115 is controlled by the application vendor.

In addition to providing a functionality that users typically use the application for, the application is configured to generate and collect application data that is of interest by, used by, and/or specified by the application vendor. The application data can cover a variety of aspects from metadata about the application's actions to information about end user behaviors to data about the end-user device 110 or services that the end-user device 110 has access to. Other application data is contemplated. The data can be sent to the collection server 115, together or in piecemeal as data elements, over one or more of the plurality of transmission pathways from the end-user device 110. Briefly, the collection server 115 is configured to, for each data element received at the collection server 115 from the end-user device 110, determine whether the data element is already stored by the collection server 115. Based on a determination that the data element is not yet stored by the collection server 115, the collection server 115 stores the data element. And, based on a determination that the data element is already stored by the collection sever 115, the collection server 115 discards the data element.

When the application receives a data element that is to be transmitted to the collection server 115, a check for network connectivity is performed and, if there is network connectivity, the data element is transmitted via a "normal" transmission means to the collection server 115. The "normal" transmission means is the regular method of transmission typically used by the application when transmitting data. The "normal" transmission means for the application may be same as or different from the "normal" transmission means for a different application.

In some embodiments, a data element is an event record of multiple data values associated with a single timestamp. For example, a data element can be an event record that includes a timestamp, an IMEI and a success/failure (true/false value) regarding whether the application has exited properly. An event record is a collection of data values. More or less data values and different data values are contemplated.

When the end-user device 110 has no network connectivity, the application prepares the application data for transmission via one or more other transmission means in case the application becomes uninstalled prior to establishing network connectivity. The application is configured to associate each data element with a globally unique transaction identifier. In some embodiments, the transaction identifier is randomly generated on the end-user device 110. The transaction identifier is unique across all devices and all transactions worldwide. In other words, over the lifetime of the data element, there is no duplication of the transaction identifier. In some embodiments, the transaction identifier is a 128-bit number, although the size can be bigger or smaller. The transaction identifier is later used by the collection server 115 to check whether the corresponding data element is already stored by the collection server 115.

The application combines each data element with an unique identifier into a data package. The data packages are stored on the end-user device 110 in various fashions. In one fashion, the data packages are stored with the application. Whenever point in time that the end-user device 110 establishes network connectivity and if the application is not uninstalled from the end-user device 110, then the data packages are transmitted via the normal transmission means to the collection server 115. In some embodiments, the transaction identifier and a checksum value (that incorporates the transaction identifier and the data element) associated with each data package are first sent to the collection server 115 to identify whether a corresponding data element has already been received and thereby stored by the collection server 115. If it is determined that the corresponding data element has already been stored by the collection server 115 based on the transaction identifier, then the data package is not transmitted to the collection server 115. However, if it is determined that either the checksum is incorrect or transaction identifier does not match any records that are already stored by the collection server 115, then the data package is transmitted to the collection server 115 over the normal transmission means so that the corresponding data element and the transaction identifier can be added to the repository 120. Alternatively, the data package is sent to the collection server 115, without first sending either the transaction identifier, the checksum value or both. The collection server 115 obtains the transaction identifier from the data package to identify whether the data element has already been stored by the collection server 115. If it is determined that the data element has already been stored by the collection server 115 based on the transaction identifier, then the data package is discarded. However, if it is determined that the transaction identifier does not match any records that are already stored by the collection server 115, then the data element and the transaction identifier are added to the repository 120.

In some embodiments, a cache system (e.g., buffer cache of an operating system) on the end-user device 110 is also utilized. The cache system stores a network address (e.g., URL) of the collection server 115 and the data packages. Whenever point in time that the end-user device 110 establishes network connectivity and if the application is uninstalled from the end-user device 110, then the URL is retrieved and the data packages are transmitted to the collection server 115 using the URL. These items (e.g., URL and the data packages) are then be removed from the cache system. At the collection server 115, the collection server 115 obtains the transaction identifier from each data package to identify whether a corresponding data element has already been stored by the collection server 115. If it is determined that the data element has already been stored by the collection server 115 based on the transaction identifier, then the data package is discarded. However, if it is determined that the transaction identifier does not match any records that are already stored by the collection server 115, then the data element and the transaction identifier are added to the repository 120.

In some embodiments, a messaging buffer queue is also utilized. The data packages are transformed into short messages (e.g., SMS, MMS), which are then queued or buffered in a native messaging application on the end-user device 110. These short messages remain in the buffer queue of the messaging application even when the application is uninstalled from the end-user device 110. Whenever point in time that the end-user device 110 establishes network connectivity, the short messages in the messaging queue are transmitted to the collection server 115 using a dedicated phone number that is associated with the collection server 115. The application is typically programmed to include the dedicated phone number such that the short messages are transmitted to the collection server 115. In some embodiments, the end-user device 100 is configured to craft an image file based on and for each data package. The image file can include a QR code or the like (e.g., another three-dimensional code or a two-dimensional code), which embeds content values, and can be stored as, for example, a JPEG file or another suitable image file. In some embodiments, included inside the QR code are the transaction identifier and a checksum value that incorporates the transaction identifier and the data element of the data package. The image file is embedded within an MMS message with a delivery address (e.g., the dedicated phone number) pointing to an SMS destination which has the collection server 115 as the receiver. At the collection server 115, the collection server 115 receives the MMS message with the QR code. The QR code is decoded and the data element is reviewed using the same algorithm as if the data element was received over normal transmission means. If it is determined that the data element has already been stored by the collection server 115 based on the transaction identifier, then the data package is discarded. However, if it is determined that the transaction identifier does not match any records that area already stored by the collection server 115, then the data element and the transaction identifier are added to the repository 120. In some embodiments, the short messages are zero rated messages to avoid billing the user for each short message transmitted from the end-user device 110 to the collection server 115.

In some embodiments, one or more of these various transmission means (e.g., via normal transmission means, via the cache system and via the messaging queue) are simultaneously executed and/or synchronized such that data elements can be recovered from the end-user device 110 even if the end-user device 110 no longer has the application installed.

For example, the user runs an application while the end-users device is offline (e.g., no network connectivity). The application generates application data. Each element of the application data is packaged with a unique transaction identifier. The data packages are stored as messages in the messaging queue and are stored in the cache system. The user removes or uninstalls the application prior to end-user device obtaining network connectivity. Assume after half an hour, the end-user device either connects to WiFi or inserts a SIM card and thereby establishes network connectivity. At that point in time, the cache data is synched against the collection sever and the SMS messages are transmitted to the collection server. The collection server is now advantageously receiving data from the end-user device that previously the application vendor never had any data for.

In FIG. 1, a single end-user device 110, a single collection server 115 and a single repository 120 are shown in the system 100 for simplicity and ease of illustration. The system 100 can include a plurality of end-user devices 110, a plurality of collection servers 115 and a plurality of repositories 120. Each of the plurality of end-user devices 110 includes, installed thereon, the application that is provided by the application vendor. Data generated by the application on each of the end-user devices 110 are sent to the plurality of collection servers 115, which is accessible or otherwise controlled by the application vendor.

In some embodiments, the collection server 115 is a dedicated server for a specific application. Alternatively, the collection server 115 is a global server for a plurality of unrelated applications. In some embodiments, each data element is not only combined with a unique identifier but also with an application identifier. The collection server 115 is configured to appropriately store each data element in one of the repositories 120 based on the application identifier.

Figure 2:
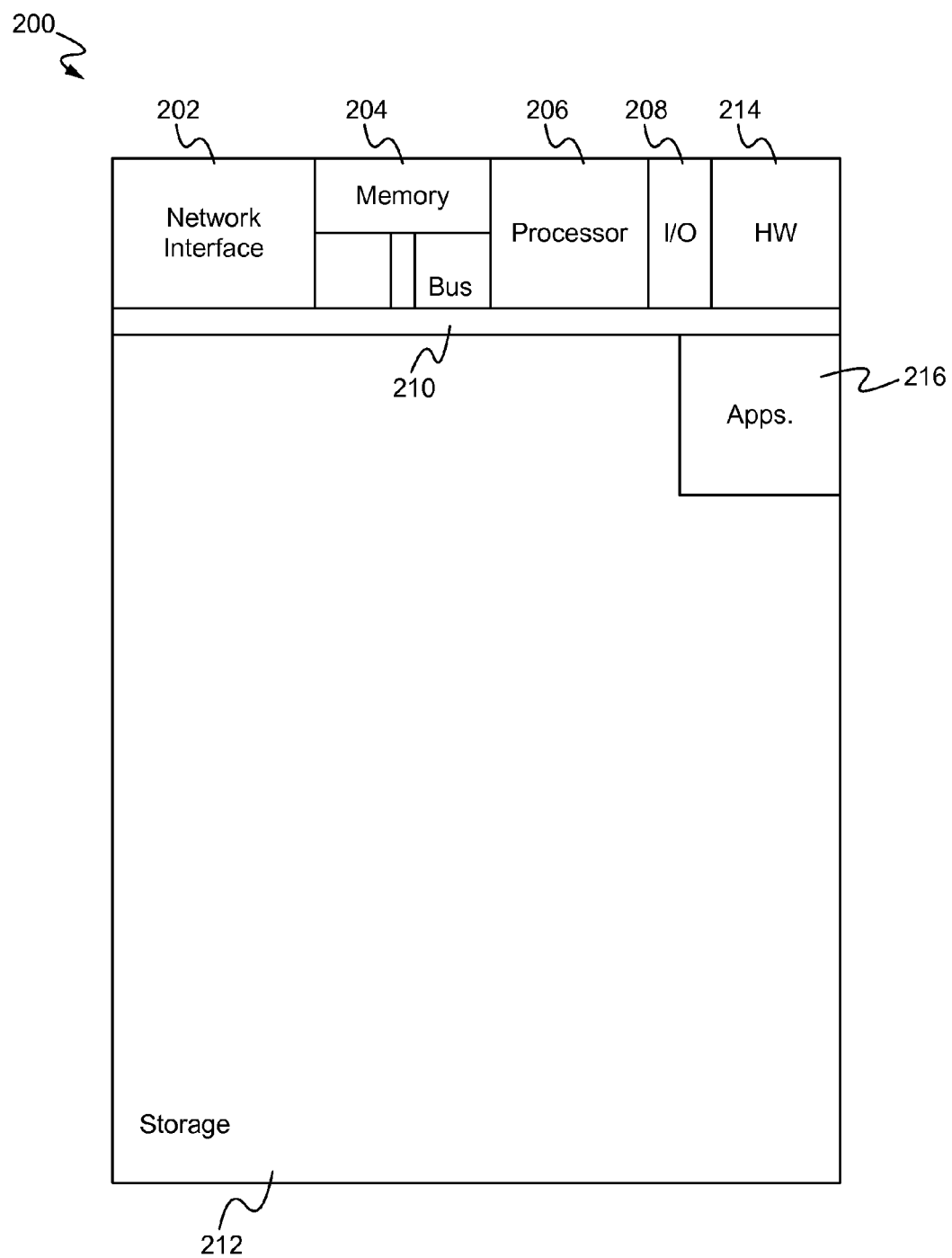
FIG. 2 illustrates a block diagram of an exemplary computing device according to some embodiments.

FIG. 2 illustrates a block diagram 200 of an exemplary computing device according to some embodiments. The computing device 200 is able to be used to acquire, cache, store, compute, search, transfer, communicate and/or display information.

In general, a hardware structure suitable for implementing the computing device 200 includes a network interface 202, a memory 204, processor(s) 206, I/O device(s) 208, a bus 210 and a storage device 212. The choice of processor 206 is not critical as long as a suitable processor with sufficient speed is chosen. In some embodiments, the computing device 200 includes a plurality of processors 206. The memory 204 is able to be any conventional computer memory known in the art. The storage device 212 is able to include a hard drive, CDROM, CDRW, DVD, DVDRW, flash memory card (e.g., SD Card), RAM, ROM, EPROM, EEPROM and/or any other storage device. The computing device 200 is able to include one or more network interfaces 202. An example of a network interface includes a network card connected to an Ethernet or other type of LAN. The I/O device(s) 208 are able to include one or more of the following: keyboard, mouse, monitor, display, printer, modem, touchscreen, button interface and other devices. Application(s) 214, such as a game application, a backup application, a transfer application, an address book application, a camera application, a memo application, etc., are likely to be stored in the storage device 212 and memory 204 and are processed by the processor 206. The application 214 includes the mechanism described above for delivering application data out of the context of the application installation (e.g., the application data are transmitted to a remote location even after the application 214 is uninstalled on the computing device 200.) More or less components or modules shown in FIG. 2 are able to be included in the computing device 200. For example, the computing device 200 can include a SIM (subscriber identity module) card connected to a mobile network. For another example, the computing device 200 can include a camera module for taking pictures and videos.

The computing device 200 can be a server or an end-user device. Exemplary end-user devices include, but are not limited to, a tablet, a mobile phone, a smart phone, a desktop computer, a laptop computer, a netbook, or any suitable computing device such as special purpose devices, including set top boxes and automobile consoles.

Figure 3:
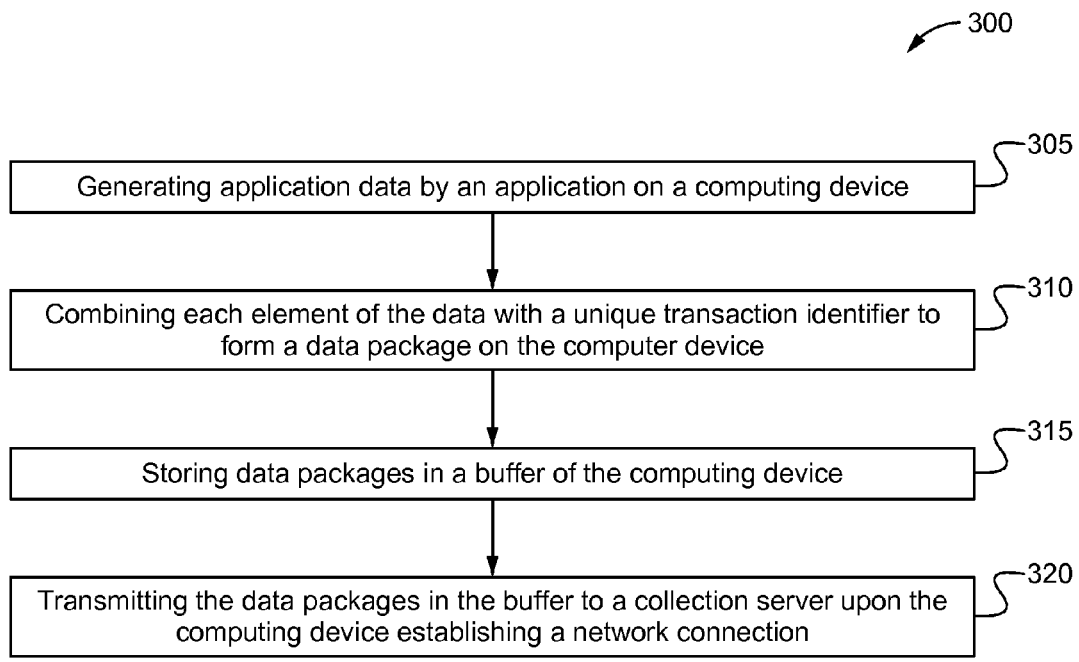
FIG. 3 illustrates an exemplary method in accordance with some embodiments.

FIG. 3 illustrates an exemplary method 300 in accordance with some embodiments. In some embodiments, the method 300 is performed by or on a computing device, such as the end-user device 110 of FIG. 1. At a step 305, application data is generated by an application on the computing device. An exemplary application is a backup application that, in addition to providing a backup functionality to a user, generates the application data (e.g., metadata regarding the backup application, etc.). At a step 310, each element of the application data is combined with a unique transaction identifier to form a data package on the computing device. At a step 310, data packages are stored in a buffer of the computing device. At a step 315, the data packages in the buffer are transmitted to a collection server upon the computing device establishing a network connection. In some embodiments, prior to the step 315, the application is removed from the computing device.

In some embodiments, the buffer is a messaging queue. In some embodiments, prior to the step 310, an image file is created for each of the data packages. The image file includes a code. The code can be a three-dimensional code or a two-dimensional code, as long as the code includes at least the unique transaction identifier for the data element. Each image file is embedded in a message. The data packages are stored in the messaging queue as these messages to be transmitted to the collection server, using a dedicated phone number associated with the collection server, via a messaging application on the computing device.

In some embodiments, the buffer is a buffer cache of an operating system of the computing device. In some embodiments, prior to the step 315, a URL of the collection server is stored along with the data packages in the buffer cache. The data packages are transmitted to the collection server using the URL.

Figure 4:
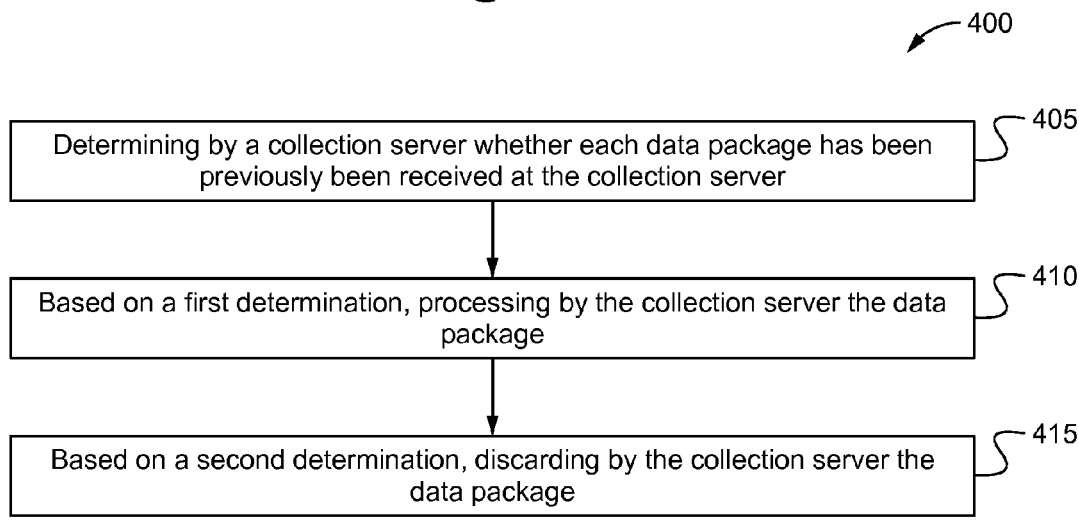
FIG. 4 illustrates an exemplary method in accordance with some embodiments.

FIG. 4 illustrates an exemplary method 400 in accordance with some embodiments. In some embodiments, the method 400 is performed by or on a computing device, such as the collection server 115 of FIG. 1. The method 400 follows the method 300 of FIG. 3. At a step 405, the collection server determines whether each data package has been previously been stored by the collection server. In some embodiments, a unique transaction identifier is extracted from the data package.

At a step 410, based on a first determination, the collection server processes the data package. In some embodiments, the first determination is a determination that the extracted identifier matches a record stored by the collection server. In some embodiments, this processing includes the collection server extracting a data element from the data package and storing the extracted data element along with the extracted identifier.

At a step 415, based on a second determination, the collection server discards the data package. In some embodiments, the second determination is a determination that the extracted identifier does not match any records stored by the collection server.

In some embodiments, the collection server generates a notification in response to each data package received at the collection server. The notification includes an acknowledgment message.

One of ordinary skill in the art will realize other uses and advantages also exist. While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

I claim:

1. A system comprising:

a computing device storing an application configured to generate application data, wherein the computing device is configured to embed the application data in a quick response (QR) code and transmit the QR code in an multimedia messaging service (MMS) message to a collection server after the computing device establishes a network connection, even after the application has been removed from the computing device; and the collection server configured to, decrypt the QR code;

for each application data element decrypted from the QR code at the collection server from the computing device:

determine whether the application data element is already stored by the collection server; based on a determination that the application data element is not yet stored by the collection server, store the application data element; and based on a determination that the application data element is already stored by the collection server, discard the application data element.

2. The system of claim 1, wherein the application data is transmitted in piecemeal to the collection server, wherein each application data element is associated with a unique transaction identifier.

3. The system of claim 2, wherein the application data is transmitted to the collection server via a plurality of transmission pathways.

4. The system of claim 3, wherein the application is provided by an application vendor, and the collection server is accessible by the application vendor.

* * * * *